Aug. 25, 1970   E. MUELLER   3,525,261
DEVICE FOR MEASURING THE TEMPERATURE OF MOLTEN MATERIALS
Filed Aug. 6, 1968   3 Sheets-Sheet 1

Inventor:
ERICH MUELLER
BY
McClew & Weiser
Attorneys.

United States Patent Office 3,525,261
Patented Aug. 25, 1970

1

3,525,261
DEVICE FOR MEASURING THE TEMPERATURE OF MOLTEN MATERIALS
Erich Mueller, Berlin, Germany, assignor to Continental Elektroindustrie Aktiengesellschaft Askania-Werke, Berlin, Germany, a corporation of Germany
Continuation-in-part of application Ser. No. 728,645, May 13, 1968. This application Aug. 6, 1968, Ser. No. 750,692
Claims priority, application Germany, Sept. 20, 1967, C 43,382
Int. Cl. G01k 11/06, 1/02
U.S. Cl. 73—358                                17 Claims

ABSTRACT OF THE DISCLOSURE

A device for measuring the temperature of molten materials comprising a heat protective carrier in which there is disposed a thermally ignitable explosive charge or cartridge; the carrier has an opening connecting to the outside of the carrier which is normally closed by a fusible lid. When the device is immersed in a melt having a temperature at least as high as the melting point of the lid, the melt is permitted by melting of the lid, to contact and denote the explosive for detection outside of the melt.

The present invention relates to a new device for the determination of the temperature of molten materials having a relatively high temperature, such as melts of metal and the like.

This application is a continuation-in-part of co-pending application Ser. No. 728,645, which is entitled Device for Measuring Temperature of Molten Materials and Method of Use, filed on May 13, 1968. The disclosure of said application is incorporated herein by reference.

In application Ser. No. 728,645, there is described and claimed a method and device for determining the temperature of molten materials, especially of metal melts, such as the melt of iron contained in a converter for refining. The method comprises introducing into the molten material, e.g. by casting or throwing, a casting device which is capable of emitting a wireless signal in relation to and dependent on the temperature of the molten material, and receiving by suitable means the signal or signals emitted by the casting device, whereby each of said signals represents a certain temperature value or threshold. The reception of the signal which is usually in relation to the time period at which it is released after insertion of the casting device into the melt indicates that the melt has a temperature at least equal to or exceeding the temperature for which the device is set to release the signal.

A preferred form of signal released by the casting device is sonic energy which is generated by the ignition of an explosive charge contained in the device. A casting device described and claimed in said application by way of example employs a fuse contact having a composition so that it melts at the predetermined temperature of the melt which is to be indicated by the device. An explosive charge is detonated by electrically setting off by a primer or the explosive charge itself, contacting the explosive charge when the fuse contact melts and closes the electrical circuit serving to initiate the primer or explosive charge, respectively.

It is an object of the present invention to provide a new, improved casting device which operates even more efficiently and is more economical.

Other objects of the invention will become apparent from the attached drawings and from the following detailed description of the invention.

2

The objects of the invention are achieved by as casting device which comprises a housing which is infusible or which melts only slowly in the melt of material, the temperature of which is to be determined. In a cavity or chamber comprised in the housing, there is contained an explosive charge which is closed off from the outside of the device by a fuse, the fuse has a composition permitting it to melt at the predetermined temperature which is to be indicated in the bath of molten material. The explosive charge is positioned in the housing with sufficient termal insulation surrounding it, so that the heat penetrating through the walls of the housing does not immediately set off the explosive charge within or prior to the time provided for the measurement. When the temperature of the bath of the melt has a value equalling or exceeding the melting point of the fuse material the fuse melts, thus permitting access of the hot molten material to the explosive charge. This results in the detonation of the explosive charge for reception of the sonic energy released thereby outside of the receptacle containing the bath of molten material. It is, of course, necessary to select the explosive charge so that it is self-detonating at a temperature at least somewhat below the preselected temperature of the bath of molten material which is to be determined. If desired, the explosive charge proper may be combined for this purpose with a heat sensitive primer which is set off first by the heat energy of the molten bath material and which in turn detonates the explosive charge.

In the preferred casting device of the present invention, the chamber for holding the explosive charge comprises a shell of an effective thermal insulator and a channel or bore connecting the inside of said chamber through said shell of thermal insulator with the outside of said casting device. The channel or bore is normally covered or closed off by a lid or cover made from a fusible material and called herein the fuse. The composition of the lid or fuse, respectively, is so selected that it melts at the temperature or temperature threshold which is to be determined in the bath of molten material.

The attached drawings illustrate several preferred embodiments of the casting device of the invention, demonstrating by way of example the arrangement of the explosive charge and its connection to the outside by a channel which is closed off by the fuse.

Figure 1:
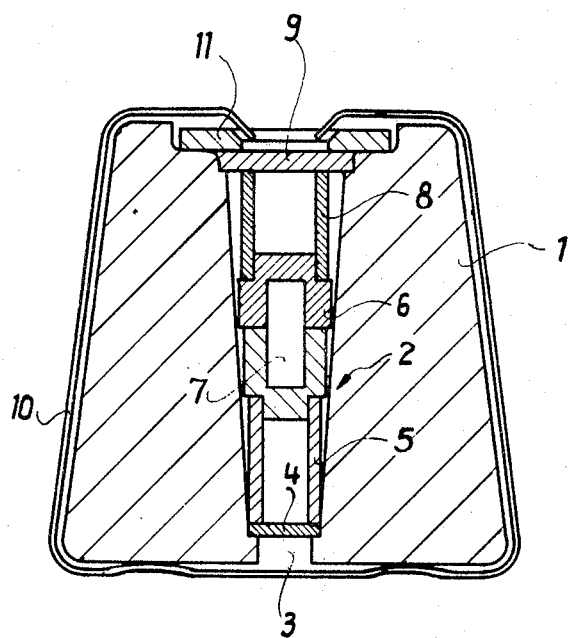
FIG. 1 is a schematical illustration of a vertical section of a basic embodiment of the device of the invention which comprises a single explosive charge and a plurality of separate, covered openings to the outside.

Referring now to FIG. 1 of the drawings, the device of the invention comprises a conically shaped body or housing 1 which comprises central, coaxial bore 2. The body 1 may be advantageously made from malleable iron, or steel, particularly if it is to be used for the measurement of the temperature of iron melts. Bore 2 is preferably likewise conically shaped with the narrow end of the cone at the base of the cone formed by body 1 and stepped down at the narrow end to form seat 3. The lower narrow bottom end of bore 2 is closed by a disc-like lid 4, which is supported on seat 3 and comprised of a material of predetermined melting point and in the range of the temperature to be determined by the device. This may be easily achieved by making lid 4 from a metallic alloy or composition comprising at least two components, e.g. as those described by way of example in copending application Ser. No. 728,645, referred to above. If the casting device is to be used for the measurement of the temperature of the molten iron in a converter, the fuse or fusible lids respectively in the device of the invention may be made from multicomponent metal alloys such as those on the basis of aluminum and cobalt, of iron and tungsten or the like.

Onto lid 4 is supported cylindrical or shell-like spacer 5 made from a thermal insulator, and made, for instance, from a ceramic material. Spacer 5 supports cartridge 6 with its narrow lower end fitted into the upper portion of spacer 5. Cartridge 6 contains a charge of explosive 7. Onto the upper end of cartridge 6 is placed another shell-like or cylindrical spacer 8 with the narrow upper end of the cartridge fitted into the low end of the spacer 8. Spacer 8 is likewise made from a thermal insulator, such as from a ceramic material. The widened top end of bore 2 is closed by another lid 9 which is made from the same material as described for lid 4. Onto lid 9 is placed flat pressure ring 11 fitted into a circular recess at the top of the body 1 and covering the edge portion of lid 9. Clamp 10 made of an elastic material of high melting point, such as a high melting metal wire is laid around body 1 with its bent ends placed onto ring 11 so as to press down ring 11 onto lid 9.

Charge 7 comprises an explosive which is thermally ignitable at a relatively low temperature, i.e. at a temperature which is lower than that of the bath of molten material the temperature of which is to be determined by the device. The housing is dimensioned and provided with walls of such a thickness that a certain minimum time, for instance 30 seconds or so, is required for the transfer of the heat of the molten bath in which the device is immersed. Lids 4 and 9 are made of relatively thin material and may be of a composition melting at a temperature of, for instance, 1650° C.

To use the device of the invention containing the explosive charge as described above is cast into the bath of molten material. If the latter has a temperature which equals or exceeds the melting temperature of lids 4 and 9, lids 4 and 9 melt, opening up the ends of bore 2 and permitting the hot molten material of the bath to flow into the chamber and to contact the cartridge, resulting in the immediate ignition and detonation of the explosive 7. The sound of the detonation indicates to the observer or to suitable reception means that the temperature of the molten material of the bath has reached or exceeds the temperature or value represented by the melting point of lids 4 and 9.

In practice, the sonic shock caused by the detonation may be registered or detected by a sonic or vibratory receiver means which converts the sonic energy into an electric signal which in turn may be indicated or recorded by a suitable device, such as an oscillograph. If the device of the invention is used for measuring the temperature of molten iron, for instance, in a converter or furnace, the sonic or vibratory receiver or detector is advantageously positioned at the walls of the converter or furnace or at its base or the like.

The embodiment of the device of the invention exemplified hereinbefore and illustrated in FIG. 1 operates satisfactorily in many situations. If the ignition temperature of the explosive charge or cartridge and the melting point of the fuses (lids 4 and 9) are relatively close together, or, if the temperature of the molten material to be determined is far below the melting point of the fuses, it is preferred to employ another embodiment of the device as exemplified, for instance, in FIG. 2. This embodiment of the invention is especially well-suited for the situation in which the device remains for some extended duration in the bath of molten material and the explosive charge may be initiated solely by the heat radiation caused by the heating of the housing and of the parts surrounding cartridge 6, and thus prior to the melting of lids 4 and 9.

Figure 2:
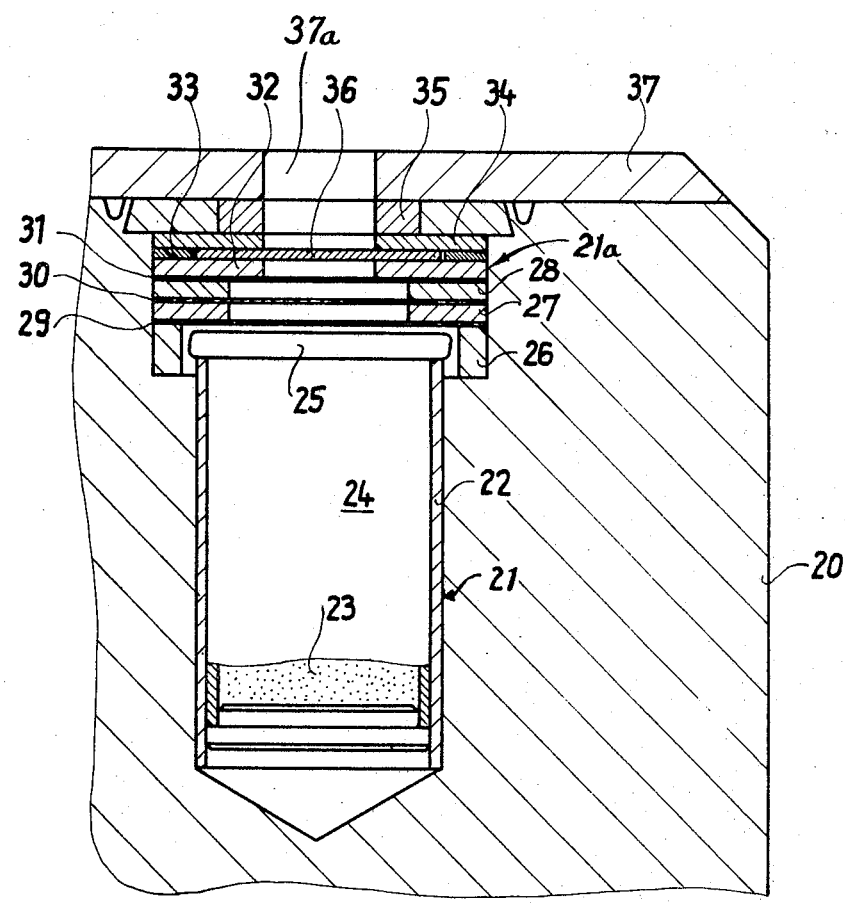
FIG. 2 is a schematic detail view in vertical section of a section of a further improved embodiment of the casting device of the invention.

The embodiment of the device illustrated in FIG. 2 comprises a carrier or housing 20 made, for instance, of steel. Carrier 20 comprises bore 21 which is preferably lined with a shell or cylinder 22 of a material having low heat conductivity, preferably of a thermal insulator such as asbestos, or the like. The upper portion of bore 21 adjoining the top surface of carrier 20 is considerably wider than the lower portion so that it forms a cylindrical cavity 21a in which are contained flat ring-like structures 26, 27 and 28, made, for instance, of copper or other heat conductive material. Between rings 26 and 27 on one hand and between rings 27 and 28 on the other hand are inserted foils 29 and 30, respectively, made of a heat conductive material, preferably of copper which is silver plated on one and preferably on both sides. A third foil 31, made preferably also of copper plate with silver on both sides is placed upon ring 28. On top of the outer edge of foil 31 is placed a flat ring 32 of a high melting thermal insulator, such as asbestos, having an inner opening of relatively smaller diameter. On ring 32 is contained a second flat ring 33, likewise made from a high melting thermal insulator, such as from asbestos, and having an inner circular opening of a diameter appreciably greater than that of ring 32. Into the inner opening of ring 33 is placed circular disc 36, which is made of a material having such a composition that it melts at a predetermined temperature. The melting point of disc 36 is selected such that it serves as the fuse, as described above, melting at the temperature to be indicated by the device. The composition of the disc may be selected as described hereinbefore. The melting point of the disc may be, for instance, 1650° C. On top of ring 33 covering also the outer edge portion of disc 36, there is positioned another ring 34 of a high melting thermal insulator, such as asbestos, having a relatively small diameter onto which there is placed another ring of asbestos or the like.

The area of the top surface of the carrier 20 to which the bores 21 and 21a respectively open is covered, at least in the surroundings of the opening defined by bore 21a by a layer of a high melting thermal insulator such as asbestos, leaving an opening 37a above the inner opening defined by rings 34 and 35. Rings 32 presses the copper foil 31 against the copper ring 28 and so forth. In the chamber prvoided by bore 21 is positioned cartridge 24 which is filled with a charge of explosive 23 and provided at its upper head portion 25 with a primer, which is thermally initiated at a suitable temperature, for instance at a temperature of 260° C. or the like, and which in turn detonates explosive charge 23.

The above described device operates in a manner similar to that illustrated in FIG. 1. The device is cast into the bath of molten material for determining the temperature of the bath. The molten material passes through opening 37a and so forth into contact with disc 36. Whenever the temperature of the molten material in the bath reaches, equals or exceeds the melting point of the material from which disc 36 is made, disc 36 melts, permitting the molten material of the bath to flow into the lower portion of cavity 21a, melting and penetrating copper foils 29, 30 and 31 and contacting the primer in head portion 25 of the cartridge 24, resulting in the immediate initiation of the thermally active primer and in the secondary detonation of explosive charge 23, for detection of the sonic shock as described before.

The device and the carrier is designed, by the choice of the outer dimensions, wall thickness, choice of material, insulation and so forth, so that the self ignition (ignition prior to the melting of the fuse or disc 36) of cartridge 24 by heat reaching it by heat transfer through the walls of carrier 20 occurs not sooner than about 40 seconds or longer after immersion of the device into the bath of molted material. The provision of the liner or shell 22 of a thermal insulator around the cartridge and in bore 21 permits the reduction of the dimensions and of the wall thickness of the carrier 20. The low heat transfer properties of liner 22 permits to greatly reduce the dimensions and wall thickness of the carrier without coming below the above stated minimum time of 40 seconds for self ignition to occur.

The heating up of foils 29, 30 and 31 by heat radiation is held within acceptable limits by the transfer of their heat to copper rings 26, 27 and 28, from where it is conducted and dissipated into the material of carrier 20. On the other hand, disc 36 of fusible material is packed in a thermal insulator, such as asbestos, in order to prevent undesired flow of heat from the disc 36, which would result in an increased time constant of the device, i.e. in a delay of the melting of disc 36 and in a delay in the desired temperature-induced detonation of the explosive charge 23. As will be appreciated by packing the disc 36 into and in between rings of the thermal insulator and by lining the upper cavity 37a and the wall area up to the disc 36 with a thermal insulator, such as asbestos, there is prevented the portion of the molten material flowing through opening 37a and in contact with the disc 36 from contacting directly the walls of the metallic and heat conductive carrier 20, thus avoiding the undesirable cooling of the critical portion of molten material which could result under certain circumstances in false or incorrect results.

Figure 3:
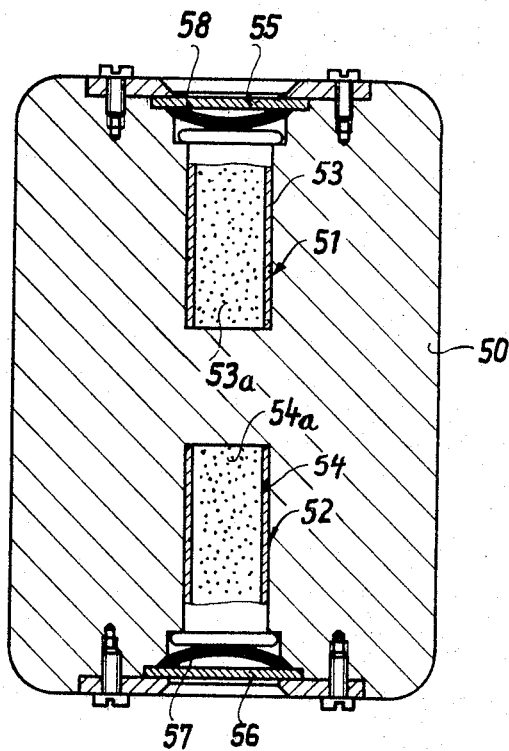
FIG. 3 is a schematic representation of a vertical section of another embodiment of the casting device of the invention comprising a plurality of explosive charges and coordinated fuses which are set to melt at different temperatures.

The embodiment of the device of the invention illustrated in FIG. 3 demonstrates an example of a device having a plurality of explosive charges. Carrier or housing 50 is provided with bores 51 and 52, penetrating from opposite ends into the carrier. Each of these bores contains a separate cartridge 53 and 54, respectively, each containing an explosive charge 53a and 54a, respectively. Bores 51 and 52 are covered by fusible lids 55 and 56 respectively, with curved, partially spherical pressure members 57 and 58, respectively, interposed between the heads of the respective cartridges 53 and 54 and the coordinated fusible lids 55 and 56, respectively. Pressure members 57 and 58 serve also as a protection against heat radiation to cartridges 53 and 54. They are for this purpose preferably provided with a layer of a thermal insulator. Lids 55 and 56 are made from material of different composition, so that each melts at a different predetermined temperature. When this device is cast into a bath of molten material having a temperature in the range between the melting temperature of the two lids 55 and 56, the cartridge coordinated to the lid having the lower melting point is immediately detonated. If the bath of molten material has or reaches a temperature equalling or exceeding the melting temperature of the second fuse or disc 55 or 56, respectively, the second cartridge is likewise detonated immediately thereafter.

The device of the just-described construction is particularly suited for use in the measurement of the temperature of molten material, the temperature of which is relatively closely known and whereby it is merely desired to indicate or measure relatively small differentials in the temperature of the molten material.

Likewise, a device of the invention may have more than two explosive charges with the necessary initiating means therefor. In such an embodiment, the carrier, as is represented by FIG. 3 is provided with one or more additional cartridge, explosive charge, fusible lids, and pressure members disposed in a suitable bore within housing 50. In this manner as many temperature levels may be measured as is desired.

The various embodiments of the device of the invention may be modified in many ways without departing from the spirit of the invention. The various features and expedients described hereinbefore with one or the other embodiment of the device may be altered or recombined to form new embodiments. Other modifications are possible as to the kind of wireless signal released by the device. For instance, it is possible to use instead of the described explosive charges, modified explosive or ignitable mixtures or compositions which display upon their detonation predetermined optical color effects so that the detonation may be observed visually or by optical detection means instead of the acoustical detection described hereinbefore.

In other embodiments of the device of the invention, the metallic carriers or housing described hereinbefore, and having relatively good heat transfer properties, may be replaced by carriers made from ceramic or other material of relatively slow heat transfer properties. This permits to further reduce the dimensions and size of the device without detriment to its operability and accuracy. It is also preferred to use such explosive charges and compositions in the cartridge which have a relatively low blasting effect in order to avoid unnecessary disturbance of the molten material and excessive strain on the receptacle containing the molten material.

Of course, it is desirable that the ignition temperature of the explosives used in the device of the invention be sufficiently above the maximum temperature expected in the storage of the device, in order to safely prevent self-ignition during handling and storage.

I claim:

1. A device for determining the temperature of a bath of molten material by immersion therein, which device comprises a carrier of a material which is substantially infusible in the molten material, a chamber provided in said carrier, an explosive charge disposed in said chamber, at least one channel connecting said chamber with the outside of said carrier for the passage of said molten material into contact with said explosive charge for its detonation by thermal ignition, and a fuse comprised of an operable closure means, which closure means closes said channel to the outside of said carrier, said means being made from a material which melts and thereby opens said channel at a predetermined temperature approximately equalling the temperature of the bath of molten material to be determined, so that the molten material is prevented by said operable closure means from contacting said explosive charge, when it has a temperature lower than said predetermined temperature, and that the molten material, by melting said closure means, flows into said channel and contacts said explosive charge when the temperature of the molten material at least equals or exceeds said predetermined temperature value.

2. The device of claim 1 in which the walls of the carrier surrounding the said chamber and explosive charge have heat transfer properties low enough to prevent the detonation of the explosive charge by the heat conducted from the molten material through the said walls to the explosive charge in a time period which is shorter than that required to melt the said fuse and detonate the explosive charge by direct contact with said molten material.

3. The device of claim 1 in which the explosive charge is contained in a cartridge comprising a primer which is capable of thermal initiation and which is disposed toward said channel for contact with the molten material when it passes into the channel upon melting of the said fuse.

4. The device of claim 3 in which the cartridge is thermally insulated from said carrier by a liner of a thermal insulator.

5. The device of claim 1 which comprises a plurality of chambers in said carrier, each chamber containing a separate explosive charge and each chamber being separately connected to the outside of said carrier by channel means closed by separate fusible operable closure means, at least two of the said closure means melting at different temperatures.

6. The device of claim 5 in which the chambers are connected in different directions by the respective channel means to the outside of the carrier.

7. The device of claim 1 in which the operable closure means is a fusible lid.

8. The device of claim 6 in which the lid is thermally insulated from the parts of the carrier body supporting it by a material having low heat transfer properties.

9. The device of claim 1 which comprises at least one thin reflecting foil means capable of reflecting heat radiation disposed between the operable closure means and the explosive charge.

10. The device of claim 9 in which each such foil is connected to the slower heating parts of the carrier.

11. The device of claim 1 in which the chamber holding the charge is connected to the outside of the device by several openings through the housing of the carrier body, with each of the openings being pointed in a different direction and being closed by a fusible lid.

12. Immersible temperature-sensitive self-igniting device useful in determining temperature of a fluid by immersion therein, comprising an insulating housing non-fusible at such fluid temperature, the housing having therein a temperature-sensitive explosive charge adapted to self-ignite at predetermined ignition temperature and having a passageway for flow of fluid from the exterior to the explosive charge, and closure means fusible at predetermined fusion temperature, normally closing the passageway, the fusible closure means closing the passageway only while below fusion temperature, the fusion temperature of the fusible closure means being above the ignition temperature of the charge.

13. Method of determining whether the temperature of a fluid is at least a given temperature, comprising the steps of immersing the device of claim 12 thereinto and observing whether the charge ignites and the time elapsing between such immersion and such ignition.

14. Method of determining whether the temperature of a fluid is at least a given temperature, comprising providing a temperature-sensitive explosive charge adapted to self-ignite at ignition temperature below the given temperature, housing the charge to insulate it, also providing a passageway for flow of fluid from the exterior to the charge and closing the passageway by closure means fusible at the given temperature, immersing the charge so housed with the fusible closure means in place into a fluid, and observing whether the charge ignites and the time elapsing between such immersion and such ignition.

15. Immersible temperature-sensitive self-igniting device useful in determining temperature of a fluid by immersion therein, comprising an insulating housing non-fusible at such fluid temperature, the housing having therein a plurality of temperature-sensitive explosive charges adapted to self-ignite at predetermined ignition temperature, the housing having separate compartments therein accommodating the respective charges, the housing also having separate passageways for flow of fluid from the exterior to the respective compartments and the charges therein, the passageways being normally closed, respectively, by closure means fusible at a corresponding plurality of predetermined fusion temperatures, the fusible closure means closing their respective passageways only while below the respective fusion temperatures, the ignition temperature of each charge being below the fusion temperature of the fusible closure means normally closing the passageway from the exterior thereto.

16. Method of determining whether the temperature of a fluid is within a given temperature range, comprising the steps of immersing thereinto the device of claim 15 having in seperate compartments two charges self-ignitable at ignition temperature below the given range, one such compartment being normally closed by closure means fusible at the temperature defining the bottom of the given range, the other such compartment being normally closed by closure means fusible at the temperature defining the top of the given range, observing the number of resulting ignitions and the times elapsing from such immersion thereto.

17. Method of determining whether the temperature of a fluid is within a given temperature range defined by a first temperature and a second temperature, comprising providing a pair of temperature-sensitive charges adapted to self-ignite at ignition temperature below the temperature range, housing the charges and thereby insulating them from the fluid and from one another, also providing separate passageways from the exterior to the respective charges, closing one passageway by first closure means fusible at the first temperature, and closing the other passageway by second closure means fusible at the second temperature, immersing the charges so housed with both fusible closure means in place into a fluid, and observing the number of such ignitions and the times elapsing from such immersion thereto.

References Cited

UNITED STATES PATENTS 401,531   4/1889   Agerskov _____ 116—106

FOREIGN PATENTS 373,304   5/1932   Great Britain.

S. CLEMENT SWISHER, Primary Examiner

D. E. CORR, Assistant Examiner

U.S. Cl. X.R.

116—105, 106, 114.5